United States Patent [19]

Corpron

[11] Patent Number: 4,464,939

[45] Date of Patent: Aug. 14, 1984

[54] VORTEX FLOWMETER BLUFF BODY

[75] Inventor: Gary P. Corpron, Chanhassen, Minn.

[73] Assignee: Rosemount Inc., Eden Prairie, Minn.

[21] Appl. No.: 357,465

[22] Filed: Mar. 12, 1982

[51] Int. Cl.³ ............................................. G01F 1/32
[52] U.S. Cl. ................................................ 73/861.24
[58] Field of Search ............ 73/861.22, 861.23, 861.24

[56] References Cited

U.S. PATENT DOCUMENTS

| | | | |
|---|---|---|---|
| 3,116,639 | 1/1964 | Bird | 73/194 |
| 3,572,117 | 3/1971 | Rodely | 73/194 |
| 3,589,185 | 6/1971 | Burgess | 73/861.22 |
| 3,693,438 | 9/1972 | Yamasaki et al. | 73/194 |
| 3,732,731 | 5/1973 | Fussell, Jr. | 73/194 |
| 3,810,388 | 5/1974 | Cousins et al. | 73/861.22 |
| 3,888,120 | 6/1975 | Burgess | 73/194 |
| 3,946,608 | 3/1976 | Herzl | 73/194 |
| 3,948,097 | 4/1976 | Kurita et al. | 73/194 |
| 3,972,232 | 8/1976 | Miller et al. | 73/194 |
| 4,003,251 | 1/1977 | Herzl | 73/194 |
| 4,005,604 | 2/1977 | Herzl | 73/194 |
| 4,033,189 | 7/1977 | Herzl et al. | 73/194 |
| 4,052,895 | 10/1977 | Herzl et al. | 73/194 |
| 4,069,708 | 1/1978 | Fussell, Jr. | 73/194 |
| 4,085,614 | 4/1978 | Curran et al. | 73/194 |
| 4,088,020 | 5/1978 | Sgourakes et al. | 73/194 |

FOREIGN PATENT DOCUMENTS 2741827 3/1978 Fed. Rep. of Germany ... 73/861.24

OTHER PUBLICATIONS

Bonfig, "Wirbelfrequenz-Durchflubmessung" in Messen+prufen/Automatik, 12/79, pp. 954-956, 959.
Article entitled "Reliable Flow Measurement Using the Vortex Shedding Principle", by Thomas H. Burgess, Advances in Instrumentation, vol. 29, p. 606/1-8, Part II, Oct. 28-31, 1974, New York, U.S.A., publ: ISA, Pittsburgh, PA.
Article entitled "A Flowmeter on the Principle of Karman's Street of Vortices", ATM-Archiv fur technisches Messen, Blatt, vol. 1246-6, (Jun. 1975), pp. 99-100, by Eggert Appel.

*Primary Examiner*—Herbert Goldstein
*Attorney, Agent, or Firm*—Kinney & Lange

[57] ABSTRACT

A vortex flowmeter utilizes a bluff body which has three sections: An upstream head member, an intermediate section co-extensive with the head member, having a width less than that of the head member, and a tail section having a width greater than the intermediate section but less than the head section. A differential pressure sensor is mounted in the intermediate section. For different pipe sizes the head member and tail section are varied but the intermediate section width is maintained constant. This allows interchangeability of the pressure sensor in the intermediate section.

16 Claims, 11 Drawing Figures

VORTEX FLOWMETER BLUFF BODY

BACKGROUND OF THE INVENTION

1. Field of the Invention

The present invention relates to flowmeters of the vortex shedding type, and more particularly to bluff body configurations for generating vortices in the flowmeter.

2. Description of the Prior Art

While the investigations of development of vortices in flow and the relationship of the frequency of formation of such vortices to the flow rate in a line date back many years, industrial quality vortex flowmeters were first introduced about in 1969. Vortex flowmeters use the phenomena of regular and alternate generation and separation of vortices from opposite sides of a suitably shaped bluff body or bar that is inserted into the fluid stream.

The basis for obtaining accuracy is to insure that the vortices are formed in a stable manner, that is that there aren't any "skips" and that the vortex shedding frequency is in fact proportional to the flow rate past the meter. In describing the vortex shedding behavior of bluff bodies, it is usual to relate the shedding frequency, bar geometry and flow rate using two nondimensional parameters. These are the Strouhal number (S) which is a proportionality constant between the vortex shedding frequency (f), the fluid velocity (v), and the maximum cross sectional width of the bar (H) given by:

$$S = fH/v \qquad \text{Equation (1)}$$

and the Reynolds number ($R_H$) relating the fluid velocity (V), the fluid density ($\rho$), the fluid viscosity ($\mu$) and the bar width (H) given by:

$$R_H = \rho v H/\mu \qquad \text{Equation (2)}$$

The bluff bodies or bars that have a constant Strouhal number over a wide range of Reynolds numbers are considered good candidates for vortex flowmeters because their vortex shedding frequency does vary linearly with flow rate.

Vortex flowmeter manufacturers commonly choose cross sections similar to the rectangle, square, triangle or T, since such bodies shed strong vortices. Although these bars shed strong vortices, they must be linearized. Prior art devices have attempted to do this in various ways i.e. by changing the bar width (H) which affects the blockage such bar causes in the conduit or pipe. Linearity of vortex shedding to flow in the conduit remains a primary concern in using vortex shedding flowmeters for geometries that shed strong vortices.

In the prior art many cross sectional variations of bluff bodies or bars have been advanced. One early patent that illustrates a variety of cross sectional geometries for a bluff body flowmeter is the patent to W. G. Bird, U.S. Pat. No. 3,116,639, issued Jan. 7, 1964. The effect of circular cross section bluff bodies mounted ahead of splitter plates or pivoting vanes is shown. Additionally, generally triangular shaped cross sections of bluff bodies and a modified diamond type shape body are shown in FIGS. 10 and 13 of this patent. The sensing of the frequency of vortex formation was done by the use of the downstream, pivoting splitter plate.

U.S. Pat. No. 3,572,117, issued Mar. 23, 1971 to A. E. Rodely illustrates bluff body flowmeters having generally triangular shaped cross sections, as well as variations of the triangular shape. Further, in FIGS. 4C and 6A of this patent, "T" shape cross section bodies are illustrated, and a "cross shaped" cross section also is shown. U.S. Pat. No. 3,572,117 indicates that the upstream facing surface of the body should be flat or convex for increased rangeability.

In U.S. Pat. No. 3,732,731 which is owned by the same company as U.S. Pat. No. 3,572,117, a modified cross sectional shape having a rounded front face is illustrated, and in U.S. Pat. No. 4,069,708 which is also owned by this same company, a plate downstream of the bluff body is used to facilitate sensing of the shed vortices.

U.S. Pat. No. 3,693,438, issued Sept. 26, 1972 to Yamasaki et al. shows a variety of bluff body cross sectional shapes including a cylindrical body that has recesses along a portion of the length of the sides thereof for purposes of enhancing vortex formation. The bluff body response was to be free of the influences of changes in flow and eddy currents in the stream to maintain a linearity of the sensed frequency of the formation of vortices with changing fluid flow. In particular, FIG. 5 of U.S. Pat. No. 3,693,438 shows recessed sides that form a type of a dimple in cross section, while other forms show flat parallel surfaces in the recessed sections.

U.S. Pat. No. 3,948,097 also shows a flow measuring device which uses a rectangular cross section bluff body related in a particular manner to the diameter of the pipe in which it is used and also the patent emphasis that the dimensions of the rectangular cross section should be related to each other for satisfactory operation.

Many of the bluff bodies illustrated in the last two mentioned patents have passageways in the bodies to facilitate the detection of vortices. However, the geometry of the disclosed bluff bodies had to be changed with changing flow line size, and this also influenced the selection of sensors to be used. Thus different sensor construction and size would likely have to be supplied with the bluff bodies for each different size fluid flow pipe.

U.S. Pat. Nos. 3,888,120; 3,946,608; 4,003,251; 4,005,604; and 4,033,189 are typical of the devices placed on the market by Fischer & Porter Co. of Warminster, Pa., and show various bluff body members that have a trailing portion connected to the bluff body through the use of one or more beams or "stings". U.S. Pat. No. 3,888,120 shows various configurations for the upstream bluff body and the trailing rear section in FIGS. 1, 5, 6 and 7 of that patent.

U.S. Pat. No. 4,052,895 which is also owned by Fischer & Porter shows a bluff body having a trailing "tail" assembly connected by an intermediate beam that has a very small cross section and does not extend along the longitudinal axis of the bluff body. Thus flow may interact in the space between the bluff body and the tail.

Additional generally T cross section shapes of bluff bodies and their associated sensors are shown in U.S. Pat. No. 3,972,232. The bluff bodies have head members with facing surfaces and a narrower body section extending downstream from the head member. In this device, the sensor is a member that moves under differential pressures that occur along the side surfaces of the downstream extending sensor bar. This patent discloses the general relationship of positioning of a sensor relative to an upstream head member for sensing pressure differentials on the body portion downstream from the head member, but does not teach the unique geometry that permits the same sensor to be used in flowmeters for a wide range of pipe diameters.

Flowmeters similar to that shown in the last mentioned patent also are disclosed and discussed in U.S. Pat. Nos. 4,085,614 and 4,088,020. Particular attention should be paid to the angular arrangement of the edges of the head member or upstream plate, as well as the transverse width of the plate in relation to the length of the sensor bar that is used. The width of the sensor bar represented by the dimension T in drawings of U.S. Pat. No. 3,972,232 changes with different pipe sizes as shown in Column 9 of that patent. This is also the case in U.S. Pat. No. 4,085,614 as disclosed in Column 9 of that patent.

While various typical cross sectional configurations are shown in the prior art the geometries of the cross sections of the prior bluff bodies do not provide for the use of a body having a sensor mounting section that remains substantially constant in its critical dimension so that the same sensor assembly can be utilized for flowmeters used on different line sizes.

SUMMARY OF THE INVENTION

A bluff body or bar for forming a vortex generating flowmeter comprising an upstream head member having a flow facing surface causing a disruption in flow of fluid in a line or pipe in which the bluff body is inserted; an intermediate section of less width than the flow facing surface connected to the head member and extending downstream relative thereto; and a tail section at the downstream end of said intermediate section of greater width than the intermediate section. The bar is configured to provide for the formation of strong vortices that are alternately and repeatably formed on the opposite sides of the intermediate section at a frequency dependent upon flow rate through the line or pipe. The intermediate section has a width that is constant for bluff bodies used across a substantial range of line sizes, so that the sensors utilized with the flowmeter (which are mounted in the intermediate section) can be standardized and yet the outputs of the flowmeters remain linear and repeatable across a substantial flow range.

DETAILED DESCRIPTION OF THE PREFERRED EMBODIMENTS

The basic equations for describing the action and effect of nondimensional parameters on vortex shedding were set forth in the Description of the Prior Art and are well known.

Figure 1:
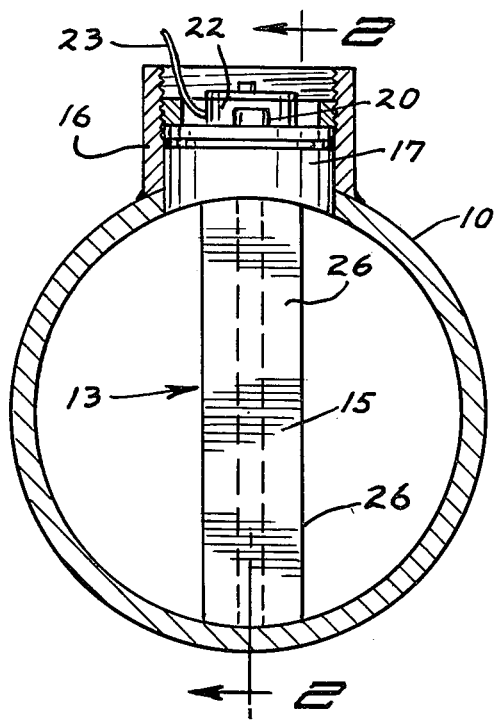
FIG. 1 is a sectional view through a line carrying fluid flow having a vortex flowmeter using a bluff body or bar made according to the present invention installed therein.

Referring to FIG. 1, a flow pipe 10 carries a fluid, the flow rate of which is to be measured. Usually the flows of liquids are measured but gases and steam can also be measured. The pipe 10 can be a meter section that is placed into an existing flow pipe or conduit, and generally the meter section will be fastened into the conduit with suitable flanges coupled to flanges on the conduit carrying the fluid. Alternatively the meter section can be a spool piece held between the flanges by bolts or other conventional means. These flanges are not shown, but are well known in the art. Flow is in the direction of arrow 11 (FIG. 2) through the pipe.

The vortex shedding flowmeter 13 made according to the present invention is shown installed on the interior of the pipe 10. The pipe wall has an opening 14 therethrough into which the bluff body or vortex shedding bar section of the flowmeter, indicated generally at 15, is inserted. The bar has a height dimension, which is measured along its longitudinal axis. Preferably bar 15 extends substantailly across the entire diameter of the pipe 10. The pipe (internal) diameter is indicated by D in FIG. 2. A suitable mounting collar 16 surrounds the opening 14 in the wall of the pipe 10, and the vortex shedding flowmeter has a plug or head 17 that fits inside the sleeve 16. Sleeve 16 may not be required as bar 15 can be mechanically fixed in position by conventional means such as bolts through the pipe wall opposite from head 17. The head 17 has a surface contoured on its bottom side to conform to the curvature of the inside diameter of the pipe 10. Cap screws 20 are used for securing the bar or bluff body 15 to the head 17. The head may be held in place in sleeve 16 in a suitable manner, for example with clamps or with an open center nut that is threaded into collar 16. As can be seen, the head 17 has an O ring 21 on its exterior which seals against the interior surface of the sleeve 16.

As will be explained, the sensing device for sensing the frequency of the vortices being formed on opposite sides of the bar 15 is mounted on the interior of the bar 15 and a portion of the connections are under a cap 22 that is mounted on the head 17. Leads 23 couples sensing circuitry of a desired form to the sensing device.

The vortex forming bar 15 is divided up into three distinct parts including a head section 25 having a flow face 26; an intermediate body section 27 that is integral with and immediately downstream from the head section 25; and a tail section 30 that is downstream of the intermediate body section 27 and integral with section 27.

Figure 2:
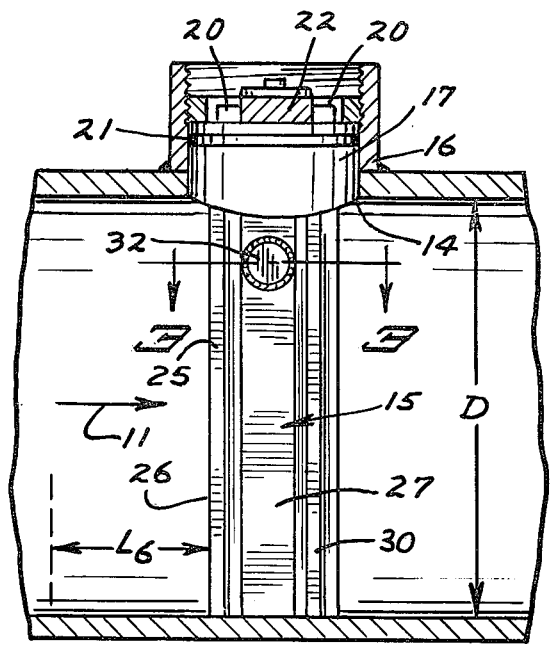
FIG. 2 is a sectional view taken as on line 2—2 of FIG. 1.
Figure 3:
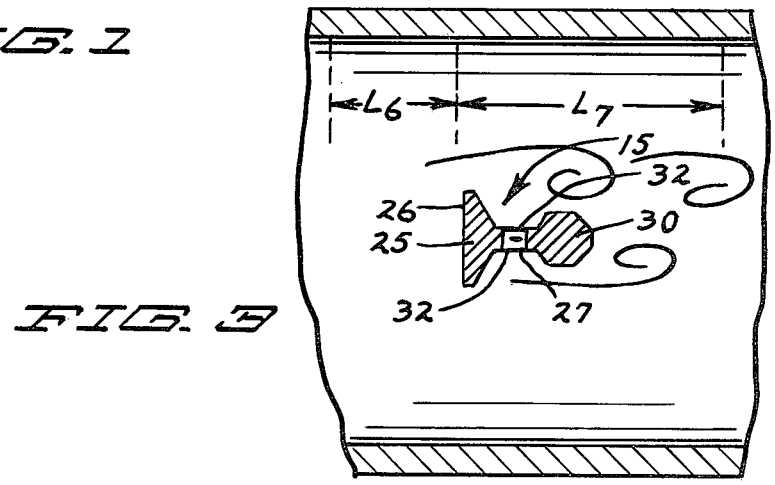
FIG. 3 is a transverse sectional view taken as on line 3—3 in FIG. 2.
Figure 4:
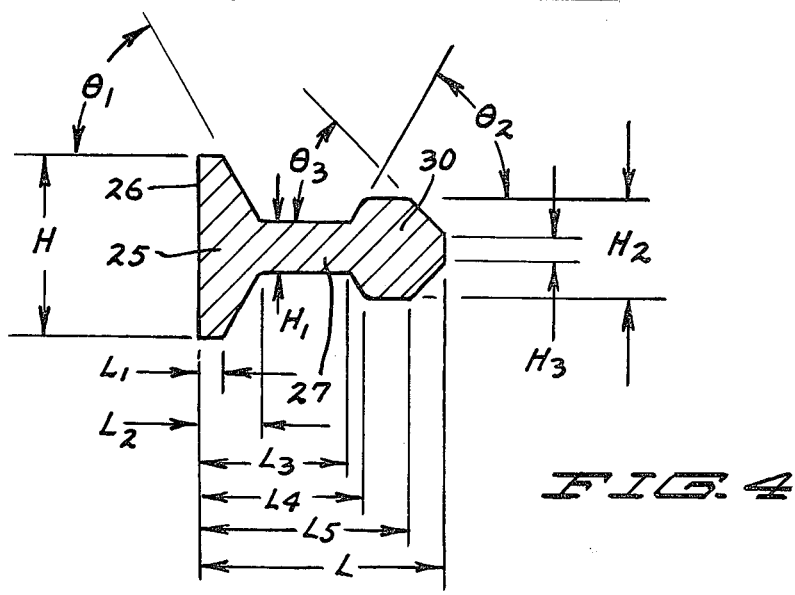
FIG. 4 is an enlarged sectional view of the bluff body shown in the flowmeter of FIG. 3 with illustrative dimensions labeled on the figure.

As shown in FIG. 4, the eleven linearly independent degrees of freedom that completely specify the meter geometry include the following:

The Pipe diameter = D (FIG. 2)
The Flow Face width = H
Bar Lengths = L, $L_1$, $L_2$, $L_3$, $L_4$ and $L_5$
Bar Intermediate width = $H_1$
The Tail widths = $H_2$ and $H_3$ Also the distances of the bar face from the nearest upstream and (if present) downstream disturbance may be designated $L_6$ and $L_7$ as represented schematically in FIG. 3, which would bring the total number of linearly independent degrees of freedom to thirteen. Angles $\theta_1$, $\theta_2$, and $\theta_3$ which are shown in FIG. 4, are dependent on some of the dimensions labeled above and are therefore not included as variables. The angles could, however, be substituted for some of the linear dimensions to form a new linearly independent set of parameters that also would completely describe the flowmeter.

The "$\theta$" angles are angles of slope of surfaces joining the portions of different widths in the cross section of the vortex shedding bar 15. The reference for measuring the angles is the longitudinal plane of the bar 15 parallel to the direction of flow. $\theta_1$, is the slope angle of the back surfaces of head section 25 between dimension H and $H_1$; $\theta_2$ is the angle of the front surfaces of the tail section 30, between $H_1$ and $H_2$; $\theta_3$ is the angle of trailing tapered surfaces of the tail section between $H_2$ and $H_3$.

There are a variety of ways for obtaining linearly independent, nondimensional sets of parameters that describe the meter cross section geometry. Two of the more common nondimensional sets of parameters are shown in Table I below. Either set shown in Table I may be used, depending on preference of the designer. Note that set 1 includes only linear dimensions, while set two includes the angles $\theta$ labeled on FIG. 4.

TABLE I

Two nondimensionalized, linearly independent sets of parameters describing the geometry of the bar cross section of FIG. 4.

| | |
|---|---|
| Set 1: | D (inches); H/D; $L_1$/H; $L_2$/H; $L_3$/H; $L_4$/H; $L_5$/H; L/H; $H_1$/H $H_2$/H; $H_3$/H and, if applicable, $L_6$/H; $L_7$/H; |
| Set 2: | D (inches); H/D; $L_1$/H; $L_3$/H; L/H; $H_1$/H; $H_2$/H; $H_3$/H; $\theta_1$; $\theta_2$; $\theta_3$; $L_6$/H; $L_7$/H. |

The two nondimensional sets of parameters shown in Table I are related by the equations:

$$\frac{L_2}{H} = \frac{L_1}{H} + \frac{1}{2}\left(1 - \frac{H_1}{H}\right) \tan(90 - \theta_1)$$

$$\frac{L_4}{H} = \frac{L_3}{H} + \frac{1}{2}\left(\frac{H_2}{H} - \frac{H_1}{H}\right) \tan(90 - \theta_2)$$

$$\frac{L_5}{H} = \frac{L}{H} - \frac{1}{2}\left(\frac{H_2}{H} - \frac{H_3}{H}\right) \tan(90 - \theta_3)$$

The utility of such sets of parameters is that once a set of values for the nondimensional parameters of either set has been determined such that the Strouhal number is a constant over a suitably wide Reynolds number range, for example and values (dimensions) have been established for a flowmeter bluff body or bar that behaves linearly in a particular line size, the nondimensional sets defined above will have been established and in theory to determine the actual dimensions for a flowmeter in another line size one simply has to know the pipe diameter, D, and perform the appropriate calculations to determine the remaining dimensions using the Set 1 or Set 2 relationships, then, based on actual performance data, the skilled designer may desire to alter certain parameters to further enhance performance. The ratio H/D is kept constant within a suitable range and other parameters are kept within essentially predetermined ranges. This also assumes, in the case of a vortex flowmeter, that the Strouhal number vs. Reynolds number and Mach number relationships are constant over the flow range of interest. Water flow is usually Mach 0.005 maximum and airflow generally is no higher than Mach 0.1 although in isolated cases airflows may be as high as Mach 0.25.

The geometry of the bar cross section of FIG. 4 can be designed for different line sizes (different values of D) in such a way that the intermediate body section width, $H_1$ remains constant ($H_1$/H increases with decreasing line size) without compromising the linearity of the meter between D=two inches and D=eight inches. Meters below D=two inches use a smaller $H_1$ dimension. Thus, for example, one inch and one and one-half inch line size meters preferably have the same $H_1$ dimension. The ability to keep $H_1$ constant across such a wide range of pipe diameters can be accomplished by varying the remaining dimensions in the set of parameters being used.

The parameters $L_6$/H and $L_7$/H are not provided in that the meter preferably operates without obstruction upstream or downstream. However, these obstructions may occur from small discontinuities in the pipe wall. For example, the meter assembly may be in a short pipe section with end flanges which is bolted and installed between two pipe sections. The junction lines along the pipe wall may form discontinuities which have to be taken into consideration.

These meters will behave satisfactorily over the flow ranges 1.25 ft/sec. to 25 ft/sec. in liquids and 10 ft/sec. to 250 ft/sec. in gases and steam. The two inch through eight inch meters preferably have a value of $H_1=0.223$ inches while the 1 in. and 1½ inch meters preferably have $H_1=0.100$ inches. $H_1$ can be any value less than $H_2$ wherein $H_1$ is imperforate and precludes fluid movement from one side of the bar to the other and wherein $H_1$ further provides sufficient spacing for housing means to sense the differential pressure caused by the vortex action.

The ranges of dimensions for a typical preferred meter relationship is as follows:

TABLE II

D = 1.049 inches to 7.981 inches
H/D = 0.2732 (This may be established by test)

$$\frac{H_1}{H} = .1 \text{ to } 0.3955$$

$$\frac{H_2}{H} = 0.4509 \text{ to } 0.5045$$

$$\frac{H_3}{H} = 0.1689 \text{ to } 0.1692$$

$$\frac{L_1}{H} = 0.0273 \text{ to } 0.1181$$

$$\frac{L_2}{H} = 0.2169 \text{ to } 0.3342$$

$$\frac{L_3}{H} = 0.7555 \text{ to } 1.000$$

$$\frac{L_4}{H} = 0.8608 \text{ to } 1.032$$

$$\frac{L_5}{H} = 1.090 \text{ to } 1.264$$

$$\frac{L}{H} = 1.334 \text{ to } 1.432$$

$\theta_1$ = 30° to 90°-preferred 58° to 60°
$\theta_2$ = 45° to 90°-preferred 60° to 90°
$\theta_3$ = 17° to 45°-preferred 30° to 45°

TABLE II-continued

D = 1.049 inches to 7.981 inches
H/D = 0.2732 (This may be established by test)

$$\frac{H_2}{H_1} = 1.140 \text{ to } 3.112$$

The fluctuating pressure coefficients, $C_p$, are related to the fluctuating differential pressures $\Delta p$ across the vortex flowmeters by the equation:

$$\Delta p = C_p \rho v^2 \sin 2\pi ft$$

where
 $\rho$ = fluid density
 v = velocity of the flow
 f = shedding frequency

These coefficients were measured at a flow velocity of approximately 1.5 ft/sec. and indicate that strong vortices are being shed.

For optimum performance, it was found that the value of L/H is dependent on the angle $\theta_3$. Thus, when $\theta_3$ was 45°, the meter having a ratio L/H of 1.33 to 1.38 generally performed best, but when $\theta_3$ was 30°, meters having L/H ratios of 1.38 to 1.43 generally performed best. The best choice for L/H appears to depend on other dimensions as well as $\theta_3$.

Each meter made as shown in FIG. 4 exhibits good linearity and with substantially the same $H_1$ dimension, thus standardized sensor arrangements are possible for a significant range of flow pipe diameters.

Referring now specifically to FIGS. 1 through 3, it can be seen that bar 15 has a diaphragm for sensing pressure indicated at 32 on the shown side thereof, and a like diaphragm preferably is positioned on the other side of the intermediate section 27 of the bar 15. As vortices are formed they switch from side to side on the bar and, hence, the pressure on each diaphragm changes. This causes the diaphragms to deflect and the diaphragms act on a sensor that senses differential pressure between the opposite sides of the intermediate section 27. A sensor that is constructed in a desired manner is shown in copending U.S. patent application, Ser. No. 357,472, filed Mar. 12, 1982 and assigned to the same assignee as this application. One feature is that the width $H_1$ can remain constant across a wide range of pipe diameters, and then the same sensor regardless of the type can be utilized for the flowmeters used in such pipes, even though the various length (L, $L_1$, $L_2$, $L_3$ . . .) dimensions (L, $L_1$, $L_2$, . . .) may change, H may change, and $H_2$ and $H_3$ also may change. Thus the sensor per se may be a prior art sensor, for example the sensor shown in U.S. Pat. No. 3,796,095.

It can be seen in FIG. 3 that vortices are generated as the flow separates along the face 26, to create alternate switching of high to low pressure along the sides of the intermediate section 27 and thus the differential pressure also changes.

The cross section of the preferred vortex forming bar includes a head portion 25 having a face width 26 that is selected in size as a function of the diameter of the pipe in which the flowmeter is used. Once the ratio H/D has been established, $H_1$ kept at a reasonable standard for a wide range of pipe diameters, the length L may be selected and also $H_2$, $L_4$ and $H_3$ selected to insure that the vortices are strongly formed, repeatable, and that linearity is established for the flowmeter.

In all cases, the tail section lateral width $H_2$ is greater than the width $H_1$ of the intermediate bar section 27, and both of these dimensions ($H_1$ and $H_2$) are kept less than the face width H of the surface 26.

Normally the face surface 26 is a plane surface perpendicular to the flow, although concave or convex surfaces or other protuberances are acceptable.

Figure 5:
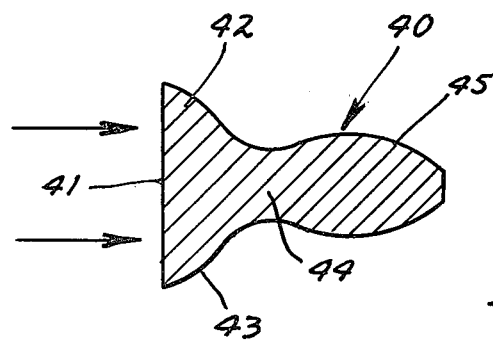
FIGS. 5, 6, 7 and 8 are additional embodiments showing the cross sectional shape of bluff bodies made according to the present invention.
Figure 6:
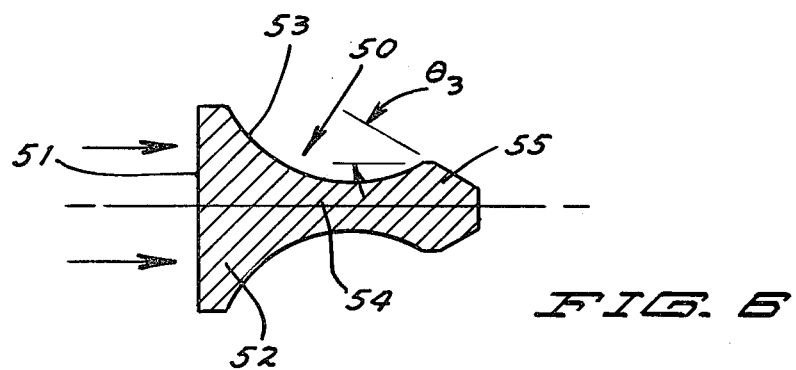
Figure 7:
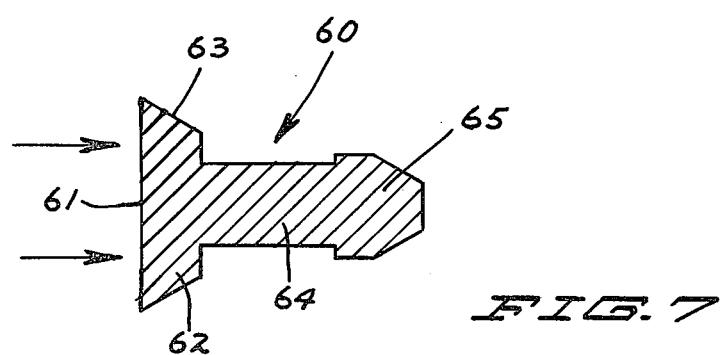

The modified embodiments of the bar cross section shown in FIGS. 5, 6 and 7 are embodiments which exhibit acceptable linearity. It can be seen that the width of the intermediate bar section can be maintained constant for flowmeters of these configurations, but dimensions such as the $L_1$ and $H_2$ dimensions vary substantially as the pipe diameter is changed. Further, it has been found that the $L_1$ dimension can, if desired, be formed to be a sharp edge without substantially affecting the performance of the flowmeter but this may affect the long term stability due to the erosion of this thin edge.

For example in FIG. 5, the vortex forming bar indicated at 40 has a cross section as shown and includes a head section 42 with a face surface 41 that is generally perpendicular to the direction of flow indicated by the arrows. The head section 42 has a smoothly curved rear or downstream facing surface 43. The intermediate bar section 44 has a transverse width $H_1$ that is sufficient to accept a standard sensor therein for a wide range of pipe diameters. The side surfaces of intermediate bar section 44 are smoothly curved as shown, but a local area of the surfaces will be made flat (for example, with a spot face or a boss) when diaphragms are used for sensing pressure so the diaphragms are planar. The rest of the side surfaces may be curved as shown.

The bar 40 includes a tail section 45 at the trailing edge of the intermediate section 44. The tail section 45 as shown has a width $H_2$ across its maximum dimension that is greater than the width $H_1$ of intermediate section 44, but less than the width H of the face surface 41.

Linearity is acceptable across the desired range of fluid flows and the intermediate section 40 has a width that remains substantially constant across a substantial range of pipe diameters so that the sensor construction can be standardized.

In FIG. 6, a greater difference between dimensions such as $L_4$ and $L_5$ is shown so that the tail section is reduced in length. In this particular embodiment the bluff body or vortex forming bar 50 has a head section 52 having an upstream face 51, that is generally perpendicular to the direction of flow as indicated. Head member 52 has straight sides for a distance $L_1$. The straight sides join concave rear surfaces 53 leading to the intermediate bar section 54. The intermediate section as shown in FIG. 6 has slightly curved (concave) side surfaces joining the tail section 55 that has a width $H_2$ that is less than the width of the face 51, but greater than the width ($H_1$) of the intermediate section 54. In this particular instance, the trailing side surfaces of the tail section 55 are planar surfaces that are formed at an angle $\theta_3$ as desired. Again, if diaphragms are used for sensing differential pressures, the side surfaces of the intermediate bar section will be formed to hold the diaphragms planar. This can be a spot face or a round boss the size of the diaphragm. The rest of the surface will be curved as shown.

In FIG. 7, the cross section of a further embodiment of a bluff body or vortex shedding bar 60 is shown and the bar includes a head section 62 having a forwardly facing face 61. Head member 62 has a tapered rear (downstream facing) surface 63 which is joined to an intermediate section 64. The tail section 65 in this particular flowmeter has an $H_2$ dimension which is at the low end of the ratio given in Table II for $H_2/H_1$.

Meters having bluff bodies or vortex shedding bars shown herein operated at flow rates between approximately 0.5 feet per second and 25 feet per second in a nominal four inch ID pipe carrying water and performed with linearity errors under one percent. In fact, the forms shown in FIGS. 4, 5 and 7 showed linearity errors of under 0.5 percent.

The ratio of the face width (H) to pipe diameter (D), (H/D), of the bluff bodies or bars in these meters was nominally in the range of 0.2732.

Figure 8:
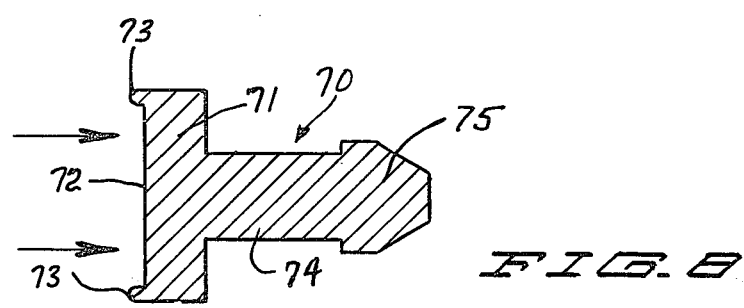

The form of the cross section in FIG. 8 includes a bar 70 having a head member 71 with a face surface 72. The head member is joined to an intermediate section 74 and a tail section 75 is also provided at the trailing end of intermediate section 74.

The head member has a pair of protuberances 73 at the side edges of the head member 71 which face upstream and may aid in forming vortices. The front face thus does not have to be planar, but may be concave as shown, or a concave curved surface, or have irregularities such as those disclosed in U.S. Pat. No. 4,171,643.

Figure 9:
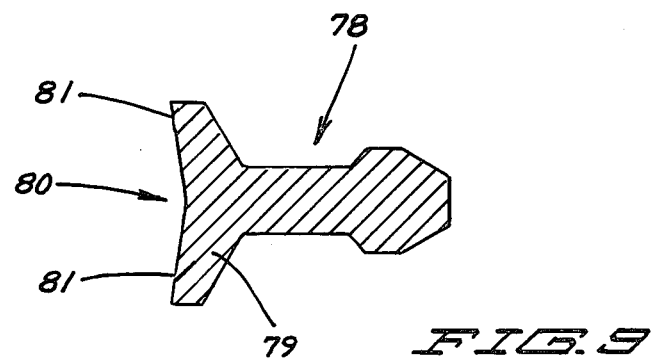
FIGS. 9, 10 and 11 disclose slight variation in the front face configuration.

In FIG. 9, a bluff body or bar 78 has a head member 79 with a concave front face 80 formed by two shallow planar surfaces 81 tapering inwardly from the sides of the head member.

Figure 10:
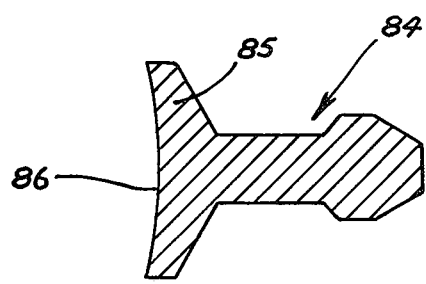

The bluff body or bar 84 shown in FIG. 10 has a head 85 with a curved concave forward face 86.

Figure 11:
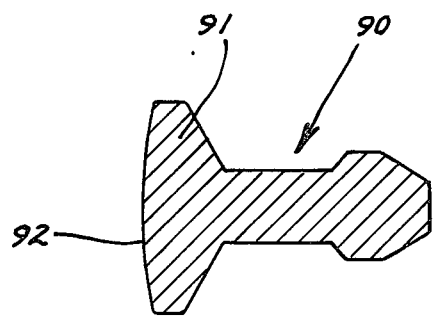

In FIG. 11 a bluff body 90 has a head member 91 with a convex face 92. The convex surface is not a deeply convex surface. The bluff bodies or bars of FIGS. 9, 10 and 11 each have intermediate body portions and tail sections as shown to provide strong vortices as previously disclosed. The front face thus does not have to be planar to work satisfactorily. Suitable sensors will be used for sensing the vibration of the bar caused by vortex formation.

All forms of the invention have bars which include a head section having a upstream facing surface with a width selected as a function of pipe diameter and with an intermediate bar section that is substantially smaller in width than the face width.

It has been found that when maintaining a constant intermediate section width for different line sizes, bars having a T configuration and having a rather abrupt increase in size between the intermediate section and the tail section tend to shed stronger vortices and provide more linear response across a wider range of flows than can be achieved without the wider tail section. The gently curved section of FIG. 6 for example also gives good linearity.

Again, the preferred ratio of the length to the face width, that is H/D, is not substantially different from the quantity H/D=0.2732.

Although the present invention has been described with reference to preferred embodiments, workers skilled in the art will recognize that changes may be made in form and detail without departing from the spirit and scope of the invention.

What is claimed is:

1. A flow measuring apparatus comprising a bluff body vortex generating element forming a bar having a longitudinal axis and having a cross section taken along a plane generally parallel to the direction of flow and perpendicular to the longitudinal axis, and being adapted to be rigidly mounted on at least one end in a stream of flowing fluid; said bar having:

a face situated to face toward and generally perpendicular to the direction of flow and having a first width in said plane perpendicular to the flow direction;

an intermediate section downstream of said face and of substantially reduced width measured in the same direction as the width of the face;

a tail section immediately downstream of said intermediate section and having a width measured in the same direction as the width of the face greater than the width of said intermediate section and less than the first width and extending outwardly from both edges of said intermediate section a desired amount;

the intermediate section being substantially imperforate and substantially co-extensive with the face and tail section in direction along the longitudinal axis; and means mounted in said intermediate section to sense the frequency of formation of vortices which flow past the intermediate section.

2. The flow measuring apparatus of claim 1 wherein said face is formed on a head section of said bar, said head section having side edges of a desired length extending in the direction of flow.

3. The flow measuring apparatus of claim 1 wherein the face and tail configurations change dimension for bars used in different diameter fluid streams, and the width of the intermediate section remains substantially constant across a range of different size bars for different diameter fluid streams with which the flow measuring apparatus is utilized.

4. The flow measuring apparatus of claim 1 wherein said flow measuring apparatus is inserted in a pipe having a diameter D, and the bar longitudinal axis extends substantially across the diameter, said first width being designated as H and selected so that the ratio H/D is substantially in the range of 0.2732.

5. The flow measuring apparatus of claim 4 wherein the intermediate section has a width designated $H_1$, and the maximum width of the tail section is designated $H_2$, and the ratio of $H_2/H_1$ is at least 1.14.

6. The flow measuring apparatus of claim 4 wherein the ratio of $H_1/H$ is within the range of 0.1 to 0.3955.

7. The flow measuring apparatus of claim 1 wherein the bar cross section is substantially uniform along the entire bar longitudinal axis and the longitudinal axis extends across the diameter of a pipe in which the flow measuring apparatus is mounted, and wherein the bar includes a head section which extends from the face to the intermediate section and which has a length in direction of flow of $L_2$, the intermediate section having a length to position where it joins the tail section of $L_3$ when measured from the face, and wherein the tail section abruptly expands in width downstream from the end of the dimension $L_3$ to the tail section maximum width.

8. The flow measuring device of claim 6 wherein the cross section of the bar has substantially straight sides along the intermediate section of the bar, and the straight sides form generally planar surfaces parallel to the longitudinal axis of the bar.

9. A flow measuring device using the principles of vortex formation which comprises:

a vortex generating body elongated along its longitudinal axis and adapted to be mounted on one end and to project into a fluid stream, said body having a cross section taken generally perpendicular its longitudinal axis which includes a head member having a substantial cross section width transverse to the direction of flow past the body, a substantially imperforate intermediate section fixed to said head member and extending downstream therefrom, said intermediate section having a cross section width transverse to the longitudinal axis substantally less than the width of the head member, and a tail section having a cross section width transverse to the longitudinal axis greater than the width of the intermediate section but substantially less than the width of the head member, the head member, intermediate section and tail section being substantially co-extensive in length along the longitudinal axis and the intermediate section being fixed to the head member and tail section, respectively, along the entire length of the head member and tail section in direction of the longitudinal axis;

means mounted on the intermediate section for sensing differential pressure on opposite sides of said intermediate section; and the head member and the tail section being varied in width and length for different ranges of pipe diameter in which the flow is to be measured while the intermediate section is maintained at a substantially constant dimension to provide interchangeability of the means for sensing differential pressure in the intermediate section.

10. The device of claim 9 wherein said tail section and the intermediate section are joined by a transition portion extending outwardly on opposite sides of said intermediate section at a selected angle greater than 30° as a minimum included angle with respect to the plane of the adjacent surface of the intermediate section.

11. The device of claim 9 wherein the flowmeter has dimensions corresponding to those set forth in FIG. 4 of the drawing and is constructed with the ratios substantially in accordance with Table II of the present specification.

12. The device of claim 9 wherein said head member has a face surface facing upstream and extending transverse to the direction of flow, and a pair of protuberances on opposite edges of the head member and extending in direction from the face opposite from the flow direction.

13. The device of claim 9 wherein the intermediate section comprises curved concave surfaces along the sides thereof when viewed in transverse cross section across the bar.

14. The device of claim 9 wherein said head member has a concave face surface facing upstream and extending transverse to the direction of flow.

15. The device of claim 9 wherein said head member has a convex face surface facing upstream and extending transverse to the direction of flow.

16. A method of constructing flow measuring devices for use in pipes carrying flow which are of different diameters, comprising the steps of:

forming vortex generating bars of different lengths for mounting in corresponding selected pipe sizes, each vortex generating bar being formed to be elongated along its longitudinal axis and adapted to be mounted at one end thereof within a pipe, and to project into a fluid stream in the pipe, each bar comprising a body being formed to have a cross-section taken generally perpendicular to its longitudinal axis which includes a head member having substantial cross-section width transverse to the direction of flow past the body, and a substantially imperforate intermediate section fixed to said head member and extending downstream therefrom, said intermediate section having a cross-section width transverse to the longitudinal axis substantially less than the width of the head member, and a tail section having a cross section width transverse to the longitudinal axis greater than the intermediate section width, but substantially less than the width of the head member, the head member, intermediate section and tail section being substantially co-extensive in length along the longitudinal axis and the intermediate section being fixed with the head member and tail section, respectively, along the entire length of the head member and tail section in direction of the longitudinal axis;

varying the head member and tail section in width and length for different bodies used in measuring the flow of respective different diameter pipes, and maintaining the intermediate section at a substantially constant width dimension for each such different body; and sensing differential in pressure on opposite sides of the intermediate section on each body using a standard differential pressure sensor that mounts in an opening in the intermediate section of each such body and which extends across the width of such intermediate section to thereby standardize the differential pressure sensor for a number of different bars used for measuring flow in different size pipes.

* * * * *